(12) United States Patent
Shah et al.

(10) Patent No.: US 6,420,046 B1
(45) Date of Patent: Jul. 16, 2002

(54) FILM WITH IMPACT AND PUNCTURE RESISTANCE

(75) Inventors: Gautam P. Shah, Simpsonville, SC (US); William W. Furrer, Boonton, NJ (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/240,729

(22) Filed: Jan. 29, 1999

(51) Int. Cl.$^7$ .......................... B32B 27/34; B32B 7/10; B32B 1/08; B65D 30/08
(52) U.S. Cl. .................. 428/475.5; 428/35.2; 428/35.7; 428/36.7; 428/200; 428/474.4; 383/109; 383/113
(58) Field of Search ................................ 428/35.2, 35.7, 428/36.6, 36.7, 34.9, 200, 349, 474.4, 475.5, 475.8, 476.1, 476.3, 476.6, 476.9, 515, 516, 521, 523; 383/109, 113

(56) References Cited

U.S. PATENT DOCUMENTS

| | | | |
|---|---|---|---|
| 4,753,700 A | 6/1988 | Fant | 264/514 |
| 4,755,419 A | 7/1988 | Shah | 428/220 |
| 5,763,095 A | 6/1998 | Ramesh et al. | 428/474.4 |

FOREIGN PATENT DOCUMENTS

| | | | |
|---|---|---|---|
| AU | B-21685/95 | * | 7/1994 |
| WO | 95/33621 A1 | | 12/1995 |

OTHER PUBLICATIONS

Blends of mLLDPE with MMW–HDPE for Films with Improved Property Stiffness Balance, pp. 633–638; 1997 Polymer, Laminations, & Coatings Conference.

* cited by examiner

Primary Examiner—Harold Pyon
Assistant Examiner—Michael C. Miggins
(74) Attorney, Agent, or Firm—Mark B. Quatt

(57) ABSTRACT

A film includes a core layer including a polymer such as nylon 6, nylon 66, nylon 6,66, and/or polyamide elastomer; first and second intermediate layers including polymeric adhesive; a first outer layer including ethylene/alpha olefin copolymer having a density of less than 0.940 grams/cubic centimeter; and a second outer layer including heat sealable polymer such as (1) ethylene/alpha olefin copolymer having a density less than 0.921 grams/cubic centimeter, (2) ethylene/vinyl acetate copolymer, (3) ethylene/alkyl (meth) acrylate copolymer, (4) ethylene/(meth)acrylic acid copolymer, and/or (5) ionomer. The film has good resistance to tear, and good resistance to impact, making it useful for packaging coins and other objects. A bag made from the film, and an article such as a sealed bag filled with coins or other objects, are also disclosed.

25 Claims, 1 Drawing Sheet

FILM WITH IMPACT AND PUNCTURE RESISTANCE

FIELD OF THE INVENTION

The present invention relates to a thermoplastic film that can be used to make a bag suitable for packaging coins or other objects; to the bag itself; and to a package containing coins or other objects.

BACKGROUND OF THE INVENTION

Coins such as the United States twenty five cent piece known as a "quarter" are typically packaged and transported by financial institutions in the US in canvas bags. In Europe and in some parts of Australasia, plastic bags are typically used. Clarity is sometimes an advantage, although some of the coin bags produced in Europe are white opaque. The canvas bag plus an appropriate closure is relatively expensive. The plastic system costs less than the canvas bag plus closure.

Plastic bags for storing and transporting coins is thus convenient in the sense that polyethylene bags can be made with a relatively high transparency, important when dealing with money, and with relatively low cost. However, commercial coin bags have an inadequate combination of resistance to tear propagation, and impact resistance. Quarters in particular have a rough, "serrated" edge which can cut bags open on impact. When dropped or thrown during transportation, loading or unloading, these bags will sometimes break open, and some of the contents will fall out of the bag. The body of the bag can be punctured or torn, or the seals can be breached by the coins. In packaging money, where accountability is essential and any loss must be accounted for, breakage and loss of contents can present a serious problem.

An improved packaging film for coins and other abusive materials should provide adequate performance in both of the physical properties discussed above: resistance to tear (as measured by tear propagation/mil, using a standard test: ASTM D 1938); and impact resistance (as measured by instrumented impact/mil, using a standard test: ASTM D 3763-95a). Other properties, such as heat sealability (so the film can be sealed together to make a bag or pouch), flexibility, i.e. relatively low tensile modulus (so a true bag can be made), and good clarity (for visual inspection of the bag contents) are also typically desirable in many packaging applications.

The inventors have developed a film, suitable for making into a bag for holding coins or other objects, exhibiting a good combination of resistance to tear and impact resistance.

SUMMARY OF THE INVENTION

In a first aspect, a multilayer film comprises a core layer comprising a polymer selected from the group consisting of nylon 6, nylon 66, nylon 6,66, and polyamide elastomer; first and second intermediate layers, each disposed on a respective opposite side of the core layer, comprising polymeric adhesive; a first outer layer, disposed on the first intermediate layer, comprising ethylene/alpha olefin copolymer having a density less than 0.940 grams/cubic centimeter; and a second outer layer, disposed on the second intermediate layer, comprising heat sealable polymer selected from the group consisting of ethylene/alpha olefin copolymer having a density less than 0.921 grams/cubic centimeter, ethylene/vinyl acetate copolymer, ethylene/alkyl (meth)acrylate copolymer, ethylene/(meth)acrylic acid copolymer, and ionomer; wherein the film has a tear propagation/mil value (ASTM D 1938) of at least 0.45 pound-inches/mil in the longitudinal direction, and at least 0.45 pound-inches/mil in the transverse direction, and an instrumented impact/mil value (ASTM D 3763-95a) of at least 0.5 joules/mil.

In a second aspect, a bag, having a first and second panel, a bag bottom, and a bag mouth, comprises a multilayer film comprising a core layer comprising a polymer selected from the group consisting of nylon 6, nylon 66, nylon 6,66, and polyamide elastomer; first and second intermediate layers, each disposed on a respective opposite side of the core layer, comprising polymeric adhesive; a first outer layer, disposed on the first intermediate layer, comprising ethylene/alpha olefin copolymer having a density less than 0.940 grams/ cubic centimeter; and a second outer layer, disposed on the second intermediate layer, comprising heat sealable polymer selected from the group consisting of ethylene/alpha olefin copolymer having a density less than 0.921 grams/cubic centimeter, ethylene/vinyl acetate copolymer, ethylene/alkyl (meth)acrylate copolymer, ethylene/(meth)acrylic acid copolymer, and ionomer; wherein the film has a tear propagation/mil value (ASTM D 1938) of at least 0.45 pound-inches/mil in the longitudinal direction, and at least 0.45 pound-inches/mil in the transverse direction, and an instrumented impact/mil value (ASTM D 3763-95a) of at least 0.5 joules/mil.

In a third aspect, an article comprises a sealed bag having a first and second panel, a bag bottom, and a sealed bag mouth, wherein the bag comprises a multilayer film comprising a core layer comprising a polymer selected from the group consisting of nylon 6, nylon 66, nylon 6,66, and polyamide elastomer; first and second intermediate layers, each disposed on a respective opposite side of the core layer, comprising polymeric adhesive; a first outer layer, disposed on the first intermediate layer, comprising ethylene/alpha olefin copolymer having a density less than 0.940 grams/ cubic centimeter; and a second outer layer, disposed on the second intermediate layer, comprising heat sealable polymer selected from the group consisting of ethylene/alpha olefin copolymer having a density less than 0.921 grams/cubic centimeter, ethylene/vinyl acetate copolymer, ethylene/alkyl (meth)acrylate copolymer, ethylene/(meth)acrylic acid copolymer, and ionomer; wherein the film has a tear propagation/mil value (ASTM D 1938) of at least 0.45 pound-inches/mil in the longitudinal direction, and at least 0.45 pound-inches/mil in the transverse direction, and an instrumented impact/mil value (ASTM D 3763-95a) of at least 0.5 joules/mil; and objects inside the sealed bag.

Definitions

"Tear Propagation" herein refers to the force required to propagate a tear from a tiny slit made by a sharp blade in a specimen of the film, measured by ASTM D 1938.

"Instrumented Impact" herein refers to the energy necessary to puncture a restrained specimen of film, measured by ASTM D 3763-95a.

"Adhesive" herein refers to polymeric adhesive, more preferably an olefin polymer or copolymer having an anhydride functionality grafted thereon and/or copolymerized therewith and/or blended therewith.

"Anhydride functionality" herein refers to any form of anhydride functionality, such as the anhydride of maleic acid, fumaric acid, etc., whether grafted onto a polymer, copolymerized with a polymer, or blended with one or more polymers, and is also inclusive of derivatives of such functionalities, such as acids, esters, and metal salts derived therefrom.

"Core layer" herein refers to the central layer of a multi-layer film. Where the film has an even number of layers, "core layer" refers to either of the two central layers of a film.

"Ethylene/alpha-olefin copolymer" (EAO) herein refers to copolymers of ethylene with one or more comonomers selected from $C_4$ to $C_{10}$ alpha-olefins such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. EAO includes such heterogeneous materials as linear medium density polyethylene (LMDPE), linear low density polyethylene (LLDPE), and very low and ultra low density polyethylene (VLDPE and ULDPE); as well as homogeneous polymers (HEAO) such as TAFMER™ ethylene/alpha olefin copolymers supplied by Mitsui Petrochemical Corporation and metallocene-catalyzed polymers such as EXACT™ resins supplied by Exxon and AFFINITY™ resins supplied by the Dow Chemical Company. EAO includes long chain branched homogeneous ethylene/alpha-olefin copolymer. An EAO can for example have a density of between 0.916 and 0.945 grams/cc.

"Ethylene/vinyl acetate copolymer" (E/VA) herein refers to a copolymer derived from ethylene and vinyl acetate, wherein the ethylene derived units in the copolymer are present in major amounts and the vinyl acetate derived units in the copolymer are present in minor amounts.

"High density polyethylene" (HDPE) herein has a density of between 0.94 and 0.965 grams per cubic centimeter.

"Intermediate" herein refers to a layer of a multi-layer film which is between an outer layer and core layer of the film.

"Linear low density polyethylene" (LLDPE) herein has a density in the range of from 0.916 to 0.925 grams per cubic centimeter.

"Linear medium density polyethylene" (LMDPE) herein has a density from 0.926 grams per cubic centimeter to 0.939 grams per cubic centimeter.

"(Meth)acrylate" herein refers to methacrylate, or to acrylate.

"(Meth)acrylic" herein refers to methacrylic, or to acrylic.

"Non-heat shrinkable" herein is a property of a material which, when heated to a temperature of 96° C., will exhibit a free shrink (ASTM D 2732-83) of less than 5% in the longitudinal direction, and less than 5% in the transverse direction.

"Outer layer" herein refers to what is typically an outermost, usually surface layer of a multi-layer film, although additional layers and/or films can be adhered to it.

"Polyamide" herein refers to both polyamides and copolyamides, and means a polymer in which amide linkages (—CONH—) occur along the molecular chain.

"Polyamide elastomer" herein refers to a block copolymer of a hard segment such as nylon 6, nylon 11 or nylon 12, and a soft segment such as a polyether or a polyester. Commercial examples include certain GRILON™ and GRILAMID™ resins from EMS-Chemie AG such as GRILON ELX 2112 and GRILAMID ELY 60.

"Polymer" herein refers to homopolymer, copolymer, terpolymer, etc. "Copolymer" herein includes copolymer, terpolymer, etc.

All compositional percentages used herein are calculated on a "by weight" basis.

"LD" or "MD" herein refers to longitudinal direction or machine direction respectively, synonymous terms for the direction of the film parallel to the path of extrusion. "TD" or "CD" herein refers to transverse or cross direction respectively, synonymous terms for the direction of the film transverse to the path of extrusion.

BRIEF DESCRIPTION OF THE DRAWINGS

A detailed description of preferred embodiments of the invention follows, with reference to the attached drawings, wherein.

DESCRIPTION OF THE PREFERRED EMBODIMENTS

Figure 1:
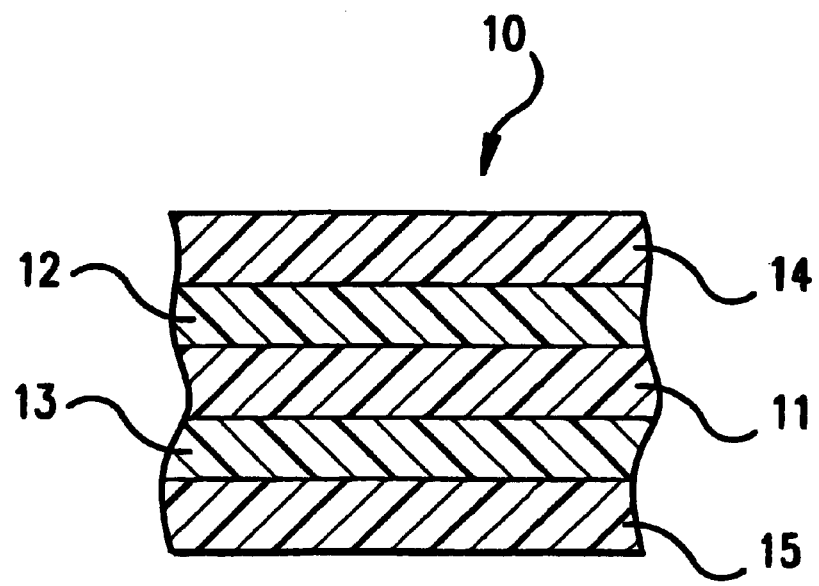
FIG. 1 is a cross-sectional view of a five layer film.

Referring to FIG. 1, a film 10 comprises a core layer 11, a first intermediate layer 12, a second intermediate layer 13, a first outer layer 14, and a second outer layer 15. Outer layers 14 and 15 are preferably surface layers.

Core layer 11 comprises nylon 6, nylon 66, nylon 6,66, polyamide elastomer, or a blend of any of these materials. The materials of the core layer 11 comprise at least 15%, preferably at least 20%, and more preferably at least 25% by weight of the film structure. The materials of the core layer 11 comprise between 15 and 45%, preferably between 20 and 40%, and more preferably between 25 and 35% by weight of the film structure.

Intermediate layers 12 and 13 each comprise polymeric adhesive, and preferably an ethylene polymer or copolymer having an anhydride functionality grafted thereon and/or copolymerized therewith and/or blended therewith. Preferred polymeric adhesives are anhydride modified ethylene/vinyl acetate copolymer, anhydride modified ethylene/alkyl (meth)acrylate copolymer, anhydride modified ethylene/(meth)acrylic acid copolymer, anhydride modified ethylene/alpha olefin copolymer, and anhydride modified low density polyethylene.

First outer layer 14 comprises ethylene/alpha olefin copolymer having a density less than 0.940, preferably less than 0.930, more preferably less than 0.925, and most preferably less than 0.922 grams/cubic centimeter. Preferred density ranges are between 0.086 and 0.939, preferably between 0.088 and 0.930, more preferably between 0.900 and 0.925, and most preferably between 0.910 and 0.922 grams/cubic centimeter. Preferred materials, depending on the desired end-use application, are heterogeneous linear low density polyethylene (linear ethylene/$C_4$–$C_{10}$ alpha-olefin copolymer), and homogeneous single-site catalyzed ethylene/$C_4$–$C_{10}$ alpha-olefin copolymer.

Optionally, first outer layer 14 can also include a release agent, where the release agent can be high density polyethylene and/or an antiblocking agent such as those well known in the art. If the release agent is high density polyethylene, it can be present in the amount of between 5 and 50%, preferably between 10 and 40%, and more preferably between 20 and 30% by weight of first outer layer 14. If the release agent is an antiblocking agent, it can be present in the amount of 0.1 to 5%, preferably 0.2 to 3%, more preferably 0.5 to 1.5%, and most preferably 0.7 to 1.2%, by weight of the outer layer 14. Antiblocking agent will typically be a diatomaceous earth or other inorganic particles introduced as a masterbatch, in which the agent is present in a small percentage, e.g. 10%, of the masterbatch. The remainder of the masterbatch is typically a low density polyethylene or linear low density polyethylene carrier.

Second outer layer 15 comprises heat sealable polymer such as ethylene/alpha olefin copolymer having a density less 0.921, more preferably less than 0.918 grams/cubic centimeter; ethylene/vinyl acetate copolymer; ethylene/alkyl (meth)acrylate copolymer; ethylene/(meth)acrylic acid copolymer; ionomer; or a blend of any of these materials. The ethylene/alpha-olefin copolymer can have a density of between 0.086 and 0.920, preferably between 0.900 and 0.919, more preferably between 0.910 and 0.918, and most preferably between 0.915 and 0.917 grams/cubic centimeter.

Optionally, second outer layer 15 can also include a release agent, where the release agent can be an antiblocking agent of the type and quantity disclosed above for first outer layer 14.

In a first alternative embodiment (see FIG. 2), a film is like that just described and shown in FIG. 1, except that an additional layer is disposed between the second intermediate layer and the second outer layer. This additional layer, designated 28 in FIG. 2, can comprise ethylene/alpha olefin copolymer having a density of less than 0.940 grams/cubic centimeter, preferably between 0.86 and 0.939, more preferably between 0.900 and 0.925, most preferably between 0.915 and 0.922 grams/cubic centimeter. Optionally, additional material such as ethylene/vinyl acetate copolymer, ethylene/alkyl (meth)acrylate copolymer, ethylene/(meth)acrylic acid copolymer, ionomer, and/or blends of any of the above materials can also be included in layer 28. Core layer 26 of FIG. 2 corresponds to core layer 11 of FIG. 1; intermediate layers 22 and 27 correspond to layers 12 and 13 respectively of FIG. 1; and layers 24 and 23 of FIG. 2 correspond to layers 14 and 15 respectively of FIG. 1. This first alternative embodiment will thus be compositionally and structurally like the film of FIG. 1, but with an additional layer disposed between the second intermediate layer and the second outer layer of FIG. 1.

Figure 2:
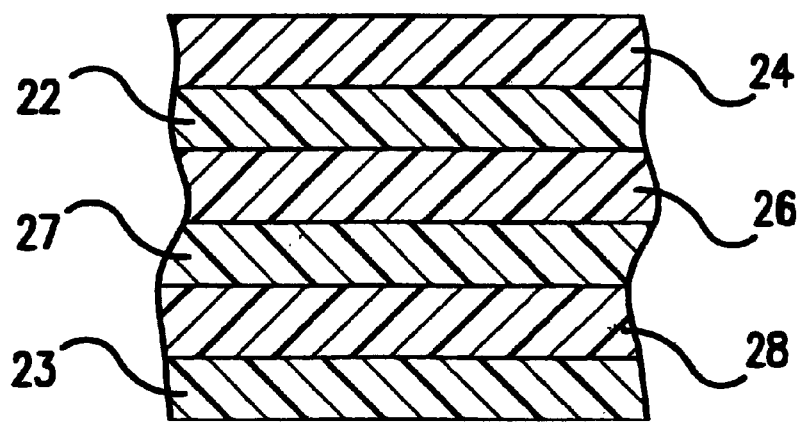
FIG. 2 is a cross-sectional view of a six layer film.

In still another alternative embodiment, a seven layer film, like that of FIG. 2, includes not only an additional layer disposed between the second intermediate layer and the second outer layer, as just described for FIG. 2, but also an additional layer disposed between the first intermediate layer and the first outer layer. Both of the additional layers can comprise any of the materials disclosed for layer 28 of FIG. 2. The result is a film of at least seven layers. This second alternative embodiment will thus be compositionally and structurally like the film of FIG. 2, but with a second additional layer disposed between first intermediate layer 22 and first outer layer 24 of FIG. 2.

The invention can be further understood by reference to the examples given below.

Table 1 identifies the materials used in the examples and comparative examples. The remaining tables describe the formulations and/or properties of films made with these materials.

TABLE 1

| Material Code | Tradename | Source(s) |
| --- | --- | --- |
| A1 | 50% HiD ™ 9659 + 50% EXCEED ™ 350D60 | Chevron + Exxon |
| A2 | 20% HiD ™ 9659 + 80% EXCEED ™ 350D60 | Chevron + Exxon |
| A3 | HiD ™ 9659 | Chevron |
| A4 | ULTRAMID ™ B4 | BASF |
| A5 | DOWLEX ™ 2045.04 | Dow |
| A6 | AFFINITY ™ PL 1880 | Dow |
| A7 | DPF 1150.01 ™ | Dow |
| A8 | 75% EXCEED ™ 350D60 + 25% EXACT ™ 3132 | Exxon |

TABLE 1-continued

| Material Code | Tradename | Source(s) |
| --- | --- | --- |
| A9 | 80% EXCEED ™ 350D60 + 20% high density polyethylene | Exxon |
| A10 | LLDPE | |
| A11 | 80% LP5103 ™ + 20% ATTANE ™ 4201 | Equistar + Dow |
| A12 | Elite ™ 5100 | Dow |
| A13 | LLDPE | |
| A14 | 80% DOWLEX ™ 2045.04 + 20% HiD ™ 9659 | Dow + Chevron |
| B1 | Bynel ™ CXA 4104 | DuPont |
| B2 | Admer ™ SF 700 | Mitsui |
| B3 | Bynel ™ CXA 3861 | DuPont |
| B4 | Bynel ™ CXA 3062 | DuPont |
| C1 | Ultramid ™ C-35 | BASF |
| D1 | 95% Elite ™ 5400 + 5% 10853 ™ antiblock masterbatch | Dow + Ampacet |
| D2 | EXCEED ™ 350D60 | Exxon |
| D3 | 90% Elite ™ 5400 + 10% 10853 ™ antiblock masterbatch | Dow + Ampacet |
| D4 | EXACT ™ 3132 | Exxon |
| D5 | 90% Elite ™ 5400 + 10% CABL 4040 ™ antiblock masterbatch | Dow + A. Shulman |

A1 is a blend of 50% high density polyethylene, and 50% single site catalyzed ethylene/1-hexene copolymer with a density of 0.917 grams/cc, and a melt index of 1.0.
A2 is a blend of 20% high density polyethylene, and 80% single site catalyzed ethylene/1-hexene copolymer with a density of 0.917 grams/cc, and a melt index of 1.0.
A3 is high density polyethylene.
A4 is nylon 6 (polycaprolactam).
A5 is LLDPE, which in this case is an ethylene/1-octene copolymer with a density of 0.920 gm/cc and an octene-1 comonomer content of 6.5%.
A6 is single site-catalyzed ethylene/1-octene copolymer with a density of 0.902 gm/cc and octene-1 content of 12% by weight.
A7 is single site-catalyzed ethylene/1-octene copolymer with a density of 0.901 gm/cc and a 1-octene content of about 12.5 wt %.
A8 is a blend of 75% single site catalyzed ethylene/1-hexene copolymer with a density of 0.917 grams/cc, and a melt index of 1.0, and 25% single site catalyzed ethylene/1-hexene copolymer with a density of 0.900 grams/cc, and a melt index of 1.2.
A9 is a blend of 80% single site catalyzed ethylene/1-hexene copolymer with a density of 0.917 grams/cc, and a melt index of 1.0, and 20% polyethylene with a density of 0.958 grams/cc and a melt index of 0.45.
A10 is a linear low density polyethylene with a density of 0.920 grams/cc.
A11 is a blend of 80% high density polyethylene with a density of 0.949 grams/cc and a melt index of 0.47, and 20% ethylene/1-octene copolymer with a density of 0.912 grams/cc, and a melt flow index of 1.0.
A12 is single site catalyzed ethylene/1-octene copolymer with a density of 0.920 grams/cc, and a melt index of 0.85.
A13 is a linear low density polyethylene with a density of 0.920 grams/cc.
A14 is a blend of 80% LLDPE, an ethylene/1-octene copolymer with a density of 0.920 gm/cc and an octene-1 comonomer content of 6.5%, and 20% high density polyethylene.
B1 is anhydride-grafted polyolefin in ethylene-butene copolymer.
B2 is anhydride-grafted polyolefin blend.
B3 is anhydride grafted polyolefin in ethylene/vinyl acetate copolymer, where the EVA has a vinyl acetate content of 25%.
B4 is anhydride grafted polyolefin in ethylene/vinyl acetate copolymer, where the EVA has a vinyl acetate content of 15 to 16.5%.
C1 is a nylon 6/66 (a copolymer of caprolactam and hexamethylene diamine adipate).
D1 is a blend of 95% ethylene/1-octene copolymer with a density of 0.916 grams/cc and a melt index of 1.0, and 5% of an additive masterbatch having about 80% LLDPE with a density of 0.918 grams/cubic centimeter, and about 20% diatomaceous earth.
D2 is single site catalyzed ethylene/1-hexene copolymer with a density of 0.917 grams/cc, and a melt index of 1.0
D3 is a blend of 90% ethylene/1-octene copolymer with a density of 0.916 grams/cc and a melt index of 1.0, and 10% of an additive masterbatch having about 80% LLDPE with a density of 0.918 grams/cubic centimeter, and about 20% diatomaceous earth.
D4 is single site catalyzed ethylene/1-hexene copolymer with a density of 0.900 grams/cc, and a melt index of 1.2.
D5 is a blend of 90% ethylene/1-octene copolymer with a density of 0.916 grams/cc and a melt index of 1.0, and 10% of a low density polyethylene-based antiblock masterbatch.

A1 is a blend of 50% high density polyethylene, and 50% single site catalyzed ethylene/1-hexene copolymer with a density of 0.917 grams/cc, and a melt index of 1.0.

A2 is a blend of 20% high density polyethylene, and 80% single site catalyzed ethylene/1-hexene copolymer with a density of 0.917 grams/cc, and a melt index of 1.0.

A3 is high density polyethylene.

A4 is nylon 6 (polycaprolactam).

A5 is LLDPE, which in this case is an ethylene/1-octene copolymer with a density of 0.920 gm/cc and an octene-1 comonomer content of 6.5%.

A6 is single site-catalyzed ethylene/1-octene copolymer with a density of 0.902 gm/cc and octene-1 content of 12% by weight.

A7 is single site-catalyzed ethylene/1-octene copolymer with a density of 0.901 gm/cc and a 1-octene content of about 12.5 wt %.

A8 is a blend of 75% single site catalyzed ethylene/1-hexene copolymer with a density of 0.917 grams/cc, and a melt index of 1.0, and 25% single site catalyzed ethylene/1-hexene copolymer with a density of 0.900 grams/cc, and a melt index of 1.2.

A9 is a blend of 80% single site catalyzed ethylene/1-hexene copolymer with a density of 0.917 grams/cc, and a melt index of 1.0, and 20% polyethylene with a density of 0.958 grams/cc and a melt index of 0.45.

A10 is a linear low density polyethylene with a density of 0.920 grams/cc.

A11 is a blend of 80% high density polyethylene with a density of 0.949 grams/cc and a melt index of 0.47, and 20% ethylene/1-octene copolymer with a density of 0.912 grams/cc, and a melt flow index of 1.0.

A12 is single site catalyzed ethylene/1-octene copolymer with a density of 0.920 grams/cc, and a melt index of 0.85.

A13 is a linear low density polyethylene with a density of 0.920 grams/cc.

A14 is a blend of 80% LLDPE, an ethylene/1-octene copolymer with a density of 0.920 gm/cc and an octene-1 comonomer content of 6.5%, and 20% high density polyethylene.

B1 is anhydride-grafted polyolefin in ethylene-butene copolymer.

B2 is anhydride-grafted polyolefin blend.

B3 is anhydride grafted polyolefin in ethylene/vinyl acetate copolymer, where the EVA has a vinyl acetate content of 25%.

B4 is anhydride grafted polyolefin in ethylene/vinyl acetate copolymer, here the EVA has a vinyl acetate content of 15 to 16.5%.

C1 is a nylon 6/66 (a copolymer of caprolactam and hexamethylene iamine adipate).

D1 is a blend of 95% ethylene/1-octene copolymer with a density of 0.916 grams/cc and a melt index of 1.0, and 5% of an additive masterbatch having about 80% LLDPE with a density of 0.918 grams/cubic centimeter, and about 20% diatomaceous earth.

D2 is single site catalyzed ethylene/1-hexene copolymer with a density of 0.917 grams/cc, and a melt index of 1.0.

D3 is a blend of 90% ethylene/1-octene copolymer with a density of 0.916 grams/cc and a melt index of 1.0, and 10% of an additive masterbatch having about 80% LLDPE with a density of 0.918 grams/cubic centimeter, and about 20% diatomaceous earth.

D4 is single site catalyzed ethylene/1-hexene copolymer with a density of 0.900 grams/cc, and a melt index of 1.2.

D5 is a blend of 90% ethylene/1-octene copolymer with a density of 0.916 grams/cc and a melt index of 1.0, and 10% of a low density polyethylene-based antiblock masterbatch.

EXAMPLES

The films, and the comparative examples ("Comp." in the Tables) discussed below, had the structures shown in the Tables. Examples 1 to 20, and comparative examples Comp. 3 through Comp. 10, were each made by a tubular coextrusion of the layers. The gauge (in mils) of each layer of each film structure is shown below each respective structure in the various tables. The layer farthest to the right in the examples of Table 2 and the remaining tables, with respect to the films of the present invention, would preferably form the food or product contact layer, and the heat sealable layer, in a typical packaging application. However, the invention is not so limited, and the film can be used in various ways, with either outer layer facing the product to be packaged.

TABLE 2

| Example | 1 | 2 | 3 |
|---|---|---|---|
| No. Of Layers | 5 | 6 | 6 |
| Film Structure | V/W/X/W/Y | V/W/X/W/Y/Z | V/W/X/W/Y/Z |
| Layer Ratio | 7/2/5/2/4 | 2/1/6/1/6/4 | 2/1/6/1/6/4 |
| Materials for each layer: | | | |
| V | A2 | A2 | A2 |
| W | B1 | B2 | B2 |
| X | C1 | C1 | A4 |
| Y | D1 | D2 | D2 |
| Z | | D1 | D1 |
| Film Thickness, Mil | 9.13 | 8.79 | 7.37 |
| Tensile At Break, Psi[1] | | | |
| LD | 6,092 | 5.542 | 6,656 |
| TD | 6,288 | 6.217 | 7,096 |
| Elongation At Break, %[2] | | | |
| LD | 554 | 494 | 503 |
| TD | 553 | 547 | 537 |
| Tensile modulus, Psi[3] | | | |
| LD | 48,970 | 36,940 | 45,450 |
| TD | 51,350 | 36,920 | 46,020 |
| Tear Propagation, Lb-In[4] | | | |
| (Energy To Break Point) LD | 4.34 | 5.46 | 4.27 |
| Avg. Thickness, Mil | 8.17 | 8.34 | 8.31 |
| lb-inch/mil | 0.53 | 0.65 | 0.51 |
| (Energy To Break Point) TD | 4.8 | 5.88 | 4.31 |
| Avg. Thickness, Mil | 8.55 | 8.21 | 8.27 |
| lb-inch/mil | 0.56 | 0.72 | 0.52 |
| Instrumented Impact, Joules[5] | 5.26 | 8.07 | 6.35 |
| (Energy To Break) | | | |
| Avg. Thickness, Mil | 8.67 | 8.84 | 7.54 |
| Joules/Mil | 0.61 | 0.91 | 0.84 |

TABLE 3

| Example | 4 | 5 | 6 |
|---|---|---|---|
| No. Of Layers | 6 | 6 | 6 |
| Film Structure | V/W/X/W/V/Y | V/W/X/W/V/Y | V/W/X/W/Y/Z |
| Layer Ratio | 4/1/6/1/4/4 | 4/1/6/1/4/4 | 4/1/7/1/4/3 |

TABLE 3-continued

| Example | 4 | 5 | 6 |
|---|---|---|---|
| Materials for each layer: | | | |
| V | A2 | A5 | A2 |
| W | B3 | B3 | B3 |
| X | C1 | C1 | C1 |
| Y | D1 | D1 | D2 |
| Z | | | D1 |
| Film Thickness, Mil | 8.31 | 7.85 | 8.35 |
| Tensile At Break, Psi | | | |
| LD | 6,861 | 6,528 | 6,978 |
| TD | 6,465 | 6,818 | 6,892 |
| Elongation At Break, % | | | |
| LD | 519 | 521 | 505 |
| TD | 502 | 539 | 514 |
| Tensile modulus, Psi | | | |
| LD | 59,730 | 47,120 | 50,580 |
| TD | 84,440 | 47,010 | 49,250 |
| Tear Propagation, Lb-In | | | |
| (Energy To Break Point) LD | 6.92 | 6.45 | 8.5 |
| Avg. Thickness, Mil | 8.35 | 7.49 | 8.83 |
| lb-inch/mil | 0.83 | 0.86 | 0.96 |
| (Energy To Break Point) TD | 6.71 | 7.57 | 8.25 |
| Avg. Thickness, Mil | 8.54 | 7.17 | 9.13 |
| lb-inch/mil | 0.79 | 1.06 | 0.9 |
| Instrumented Impact, Joules (Energy To Break) | 6.68 | 7.74 | 9.81 |
| Avg. Thickness, Mil | 7.88 | 8.43 | 8.7 |
| Joules/Mil | 0.85 | 0.92 | 1.13 |

TABLE 4

| Example | 7 | 8 | 9 |
|---|---|---|---|
| No. Of Layers | 6 | 6 | 6 |
| Film Structure | V/W/X/W/Y/Z | V/W/X/W/Y/Z | V/W/X/W/V/Y |
| Layer Ratio | 4/1/7/1/4/3 | 4/1/7/1/4/3 | 4/1/7/1/4/3 |
| Materials for each layer: | | | |
| V | A2 | A2 | A5 |
| W | B4 | B3 | B3 |
| X | C1 | C1 | C1 |
| Y | D2 | D2 | D3 |
| Z | D1 | D3 | |
| Film Thickness, Mil | 8.5 | 8.68 | 9 |
| Tensile At Break, Psi | | | |
| LD | 7,530 | 5,623 | 6,372 |
| TD | 7,376 | 6,477 | 6,168 |
| Elongation At Break, % | | | |
| LD | 535 | 504 | 521 |
| TD | 521 | 546 | 537 |
| Tensile modulus, Psi | | | |
| LD | 58,550 | 37,760 | 34,470 |
| TD | 53,560 | 34,770 | 34,100 |
| Tear Propagation, Lb-In | | | |
| (Energy To Break Point) LD | 8.54 | 5.4 | 9 |
| Avg. Thickness, Mil | 9.26 | 9.5 | 10.1 |

TABLE 4-continued

| Example | 7 | 8 | 9 |
|---|---|---|---|
| lb-inch/mil | 0.92 | 0.57 | 0.89 |
| (Energy To Break Point) TD | 8.25 | 6.5 | 8.5 |
| Avg. Thickness, Mil | 9.25 | 9.61 | 9.67 |
| lb-inch/mil | 0.89 | 0.68 | 0.88 |
| Instrumented Impact, Joules (Energy To Break) | 9.82 | 10.06 | 9.466 |
| Avg. Thickness, Mil | 8.61 | 8.69 | 8.8 |
| Joules/Mil | 1.14 | 1.16 | 1.08 |

TABLE 5

| Example | 10 | 11 | 12 |
|---|---|---|---|
| No. Of Layers | 6 | 6 | 6 |
| Film Structure | V/W/X/W/Y/Z | V/W/X/W/V/Y | V/W/X/W/V/Y |
| Layer Ratio | 4/1/7/1/4/3 | 4/1/7/1/4/3 | 4/1/7/1/4/3 |
| Materials for each layer: | | | |
| V | A2 | A6 | A7 |
| W | B3 | B3 | B3 |
| X | C1 | C1 | C1 |
| Y | D4 | D3 | D3 |
| Z | D3 | | |
| Film Thickness, Mil | 8.76 | 8.62 | 8.46 |
| Tensile At Break, Psi | | | |
| LD | 6,655 | 7,322 | 6,309 |
| TD | 5,478 | 6,572 | 6,688 |
| Elongation At Break, % | | | |
| LD | 559 | 567 | 517 |
| TD | 499 | 524 | 529 |
| Tensile modulus, Psi | | | |
| LD | 28,960 | 30,010 | 30,130 |
| TD | 28,290 | 33,510 | 31,290 |
| Tear Propagation, Lb-In | | | |
| (Energy To Break Point) LD | 4.15 | 4.76 | 4.8 |
| Avg. Thickness, Mil | 8.73 | 8.97 | 9.01 |
| lb-inch/mil | 0.48 | 0.53 | 0.53 |
| (Energy To Break Point) TD | 4.67 | 8.84 | 9.4 |
| Avg. Thickness, Mil | 8.69 | 9.07 | 9.22 |
| lb-inch/mil | 0.54 | 0.97 | 1.02 |
| Instrumented Impact, Joules (Energy To Break) | 9.67 | 10.18* | 11.35* |
| Avg. Thickness, Mil | 8.9 | 8.64 | 8.61 |
| Joules/Mil | 1.09 | 1.18 | 1.32 |

TABLE 6

| Example | 13 | 14 | 15 |
|---|---|---|---|
| No. Of Layers | 6 | 6 | 6 |
| Film Structure | V/W/X/W/V/Y | V/W/X/W/V/Y | V/W/X/W/V/Y |
| Layer Ratio | 4/1/7/1/4/3 | 4/1/7/1/4/3 | 5/1/7/1/4/2 |
| Materials for each layer: | | | |
| V | A8 | A9 | A10 |
| W | B3 | B3 | B3 |
| X | C1 | C1 | C1 |
| Y | D3 | D3 | D3 |
| Z | | | |

TABLE 6-continued

| Example | 13 | 14 | 15 |
|---|---|---|---|
| Film Thickness, Mil | 8.76 | 8.19 | 8.51 |
| Tensile At Break, Psi | | | |
| LD | 5,950 | 6,672 | 7,448 |
| TD | 6,907 | 7,286 | 7,410 |
| Elongation At Break, % | | | |
| LD | 489 | 504 | 574 |
| TD | 540 | 551 | 549 |
| Tensile modulus, Psi | | | |
| LD | 34,210 | 47,770 | 37,760 |
| TD | 33,990 | 43,900 | 38,380 |
| Tear Propagation, Lb-In | | | |
| (Energy To Break Point) LD | 4.74 | 5.18 | 5.17 |
| Avg. Thickness, Mil | 8.5 | 8.89 | 9.2 |
| lb-inch/mil | 0.56 | 0.58 | 0.56 |
| (Energy To Break Point) TD | 6.51 | 5.79 | 6.07 |
| Avg. Thickness, Mil | 8.77 | 9.24 | 8.98 |
| lb-inch/mil | 0.74 | 0.63 | 0.69 |
| Instrumented Impact, Joules | 12.17* | 8.03* | 8.71* |
| (Energy To Break) | | | |
| Avg. Thickness, Mil | 9.42 | 8.41 | 8.35 |
| Joules/Mil | 1.29 | 0.95 | 1.04 |

TABLE 7

| Example | 16 | 17 | 18 |
|---|---|---|---|
| No. Of Layers | 6 | 6 | 6 |
| Film Structure | V/W/X/W/Y/Z | V/W/X/W/Y/Z | V/W/X/W/Y/Z |
| Layer Ratio | 4/1/7/1/4/3 | 4/1/7/1/4/3 | 4/1/7/1/4/3 |
| Materials for each layer: | | | |
| V | A9 | A9 | A9 |
| W | B3 | B3 | B3 |
| X | C1 | C1 | C1 |
| Y | A8 | D2 | D2 |
| Z | D3 | D3 | D5 |
| Film Thickness, Mil | 9.71 | 9.29 | 9.39 |
| Tensile At Break, Psi | | | |
| LD | 5,867 | 6,135 | 5,336 |
| TD | 6,248 | 5,874 | 6,225 |
| Elongation At Break, % | | | |
| LD | 507 | 528 | 488 |
| TD | 509 | 519 | 515 |
| Tensile modulus, Psi | | | |
| LD | 40,570 | 42,590 | 33,850 |
| TD | 40,530 | 37,610 | 36,220 |
| Tear Propagation, Lb-In | | | |
| (Energy To Break Point) LD | 8.86 | 7.26 | 7.99 |
| Avg. Thickness, Mil | 8.83 | 9.53 | 8.78 |
| lb-inch/mil | 1 | 0.76 | 0.91 |
| (Energy To Break Point) TD | 10.43 | 7.31 | 8.49 |
| Avg. Thickness, Mil | 8.91 | 9.55 | 8.77 |
| lb-inch/mil | 1.17 | 0.77 | 0.97 |
| Instrumented Impact, Joules | 10.51 | 9.97 | 7.59 |
| (Energy To Break) | | | |

TABLE 7-continued

| Example | 16 | 17 | 18 |
|---|---|---|---|
| Avg. Thickness, Mil | 9.27 | 9.25 | 9.11 |
| Joules/Mil | 1.13 | 1.08 | 0.83 |

TABLE 8

| Example | 19 | 20 | Comp. 1 |
|---|---|---|---|
| No. Of Layers | 6 | 6 | 2 |
| Film Structure | V/W/X/W/V/Y | V/W/X/W/V/Y | ** |
| Layer Ratio | 4/1/5/1/6/3 | 4/1/6/1/5/3 | — |
| Materials for each layer: | | | |
| V | A12 | A13 | — |
| W | B3 | B3 | — |
| X | C1 | C1 | — |
| Y | D3 | D3 | — |
| Z | | | — |
| Film Thickness, Mil | 9.48 | 8.9 | 5.15 |
| Tensile At Break, Psi | | | |
| LD | 5,103 | 5,422 | 3,969 |
| TD | 5,493 | 5,980 | 3,938 |
| Elongation At Break, % | | | |
| LD | 499 | 505 | 782 |
| TD | 514 | 540 | 621 |
| Tensile modulus, Psi | | | |
| LD | 45,990 | 58,490 | 48,480 |
| TD | 38,350 | 38,700 | 39,290 |
| Tear Propagation, Lb-In | | | |
| (Energy To Break Point) LD | 7.38 | 6.38 | 9.2 |
| Avg. Thickness, Mil | 9.89 | 9.46 | 4.86 |
| lb-inch/mil | 0.75 | 0.67 | 1.89 |
| (Energy To Break Point) TD | 8.68 | 7.52 | 3.3 |
| Avg. Thickness, Mil | 9.66 | 9.53 | 5.02 |
| lb-inch/mil | 0.9 | 0.79 | 0.66 |
| Instrumented Impact, Joules | 7 | 7.41 | 0.67 |
| (Energy To Break) | | | |
| Avg. Thickness, Mil | 9.89 | 9.26 | 5.01 |
| Joules/Mil | 0.71 | 0.8 | 0.13 |

TABLE 9

| Example | Comp. 2 | Comp. 3 | Comp. 4 |
|---|---|---|---|
| No Of Layers | 1 | 3 | 3 |
| Film Structure | *** | V/W/X | V/W/X |
| Layer Ratio | — | 1/3/1 | 4/11/5 |
| Materials for each layer: | | | |
| V | — | A11 | A11 |
| W | — | D2 | A5 |
| X | — | D3 | D3 |
| Y | — | | |
| Z | — | | |
| Film Thickness, Mil | 7.81 | 8.49 | 9.43 |
| Tensile At Break, Psi | | | |
| LD | 5,344 | 5,984 | 4,397 |
| TD | 5,230 | 5,824 | 4,281 |
| Elongation At Break, % | | | |
| LD | 892 | 830 | 865 |
| TD | 934 | 845 | 818 |
| Tensile modulus, Psi | | | |
| LD | 17,290 | 34,670 | 38,880 |

TABLE 9-continued

| Example | Comp. 2 | Comp. 3 | Comp. 4 |
|---|---|---|---|
| TD | 18,620 | 37,260 | 39,050 |
| Tear Propagation, Lb-In | | | |
| (Energy To Break Point) LD | 8.6 | 10.46 | 16.33 |
| Avg. Thickness, Mil | 8.05 | 9.57 | 10.1 |
| lb-inch/mil | 1.07 | 1.09 | 1.62 |
| (Energy To Break Point) TD | 18.1 | 11.83 | 20.44 |
| Avg. Thickness, Mil | 8.13 | 9.48 | 10 |
| lb-inch/mil | 2.23 | 1.25 | 2.04 |
| Instrumented Impact, Joules | 0.96 | 2.49 | 1.89 |
| (Energy To Break) | | | |
| Avg. Thickness, Mil | 8.09 | 8.41 | 9.75 |
| Joules/Mil | 0.12 | 0.3 | 0.19 |

TABLE 10

| Example | Comp. 5 | Comp. 6 | Comp. 7 |
|---|---|---|---|
| No. Of Layers | 3 | 3 | 5 |
| Film Structure | V/W/X | V/W/X | V/W/X/W/Y |
| Layer Ratio | 4/11/5 | 1/3/1 | 7/2/5/2/4 |
| Materials for each layer: | | | |
| V | A14 | A2 | A3 |
| W | A5 | A5 | B1 |
| X | D3 | D3 | C1 |
| Y | | | D1 |
| Z | | | |
| Film Thickness, Mil | 9.37 | 9.26 | 8.54 |
| Tensile At Break, Psi | | | |
| LD | 4,485 | 4,795 | 6,041 |
| TD | 4,114 | 4,793 | 5,729 |
| Elongation At Break, % | | | |
| LD | 834 | 828 | 539 |
| TD | 822 | 822 | 554 |
| Tensile modulus, Psi | | | |
| LD | 29,880 | 28,730 | 89,030 |
| TD | 29,480 | 29,560 | 91,450 |
| Tear Propagation, Lb-In | | | |
| (Energy To Break Point) LD | 17.15 | 14.98 | 4.64 |
| Avg. Thickness, Mil | 9.87 | 9.32 | 8.35 |
| lb-inch/mil | 1.73 | 1.61 | 0.56 |
| (Energy To Break Point) TD | 17.37 | 13.29 | 5.62 |
| Avg. Thickness, Mil | 9.74 | 9.31 | 8.35 |
| lb-inch/mil | 1.78 | 1.43 | 0.67 |
| Instrumented Impact, Joules | 2.59 | 2.7 | 2.05 |
| (Energy To Break) | | | |
| Avg. Thickness, Mil | 10.33 | 9.8 | 8.1 |
| Joules/Mil | 0.25 | 0.28 | 0.25 |

TABLE 11

| Example | Comp. 8 | Comp. 9 | Comp. 10 |
|---|---|---|---|
| No. Of Layers | 5 | 6 | 6 |
| Film Structure | V/W/X/W/Y | V/W/V/W/X/Y | V/W/V/W/X/Y |
| Layer Ratio | 7/2/5/2/4 | 4/1/4/1/6/4 | 4/1/4/1/6/4 |
| Materials for each layer: | | | |
| V | A1 | A4 | C1 |
| W | B1 | B2 | B2 |
| X | C1 | D2 | D2 |
| Y | D1 | D1 | D1 |
| Z | | | |
| Film Thickness, Mil | 8.65 | 7.83 | 8.14 |
| Tensile At Break, Psi | | | |
| LD | 5,520 | 6,291 | 6,799 |
| TD | 5,798 | 7,482 | 6,420 |
| Elongation At Break, % | | | |
| LD | 527 | 410 | 464 |
| TD | 556 | 437 | 461 |
| Tensile modulus, Psi | | | |
| LD | 64,080 | 54,110 | 37,090 |
| TD | 63,110 | 56,230 | 35,340 |
| Tear Propagation, Lb-In | | | |
| (Energy To Break Point) LD | 4.72 | 3.01 | 4.61 |
| Avg. Thickness, Mil | 8.39 | 7.61 | 7.74 |
| lb-inch/mil | 0.56 | 0.4 | 0.6 |
| (Energy To Break Point) TD | 5.23 | 3.06 | 4.85 |
| Avg. Thickness, Mil | 8.54 | 7.4 | 7.92 |
| lb-inch/mil | 0.61 | 0.41 | 0.61 |
| Instrumented Impact, Joules | 3.53 | 5.14 | 4.49 |
| (Energy To Break) | | | |
| Avg. Thickness, Mil | 8.32 | 7.52 | 8.23 |
| Joules/Mil | 0.42 | 0.68 | 0.55 |

In the Tables herein, methodology for generating the physical properties were as indicated in the superscripts in the Tables, corresponding to the following ASTM tests:

[1] ASTM D 882-95.
[2] ASTM D 882-95.
[3] ASTM D 882-95.
[4] ASTM D 1938.
[5] ASTM D 3763-95a.
[6] The sample did not break. The sample did break when the test was repeated.
\* The sample did not break.
\*\* Comp. 1 is a multilayer thermoplastic polyolefinic film commercial in Europe.
\*\*\* Comp.2 is a monolayer thermoplastic polyolefinic film commercial in New Zealand.

Layer ratios indicated in the above tables are approximate.

Films of the present invention can be made by any suitable process, including coextrusion, lamination, extrusion coating, or corona bonding and are preferably made by tubular blown or cast coextrusion. Bags can be made by any suitable process, such as that shown in U.S. Pat. No. 3,741,253 (Brax et al.), hereby incorporated by reference in its entirety. Side sealed bags are preferred for the primary intended end use disclosed herein. These bags can be made from single wound or double wound films.

Films of the present invention are preferably non-heat shrinkable, since heat shrinkability is not required for the primary intended end-use application, and since imparting shrinkability to a film increases the cost of production. Also, in the primary end use disclosed herein, typical packaging equipment includes continuous heat hot bar sealers. If heat shrinkable film were used, the film would be prone to wrinkling in the seal area of a bag or other package made from the film. If an impulse type sealer were used, however, this would permit the use of heat shrinkable film. However, for other applications where dimensional stability at elevated temperatures is not required or desired, films can be stretch oriented by convention orientation processes well known in the art, such as the trapped bubble or tenter frame processes, to render the material heat shrinkable. In such cases, films of the present invention can optionally be crosslinked by irradiation, or chemically.

The multilayer film of the present invention can have any total thickness desired, so long as the film provides the desired properties for the particular packaging operation in which the film is used. Final film thicknesses can vary, depending on process, end use application, etc. Typical thicknesses range from 1 to 20 mils, preferably 4 to 15 mils, more preferably 7 to 12 mils, and most preferably 8 to 10 mils.

The multilayer films of the present invention can have a tear propagation/mil value (ASTM D 1938) of at least 0.45, preferably at least 0.5, more preferably at least 0.55, and most preferably at least 0.6 pound-inches/mil, such as at least 0.7, at least 0.8, at least 0.9, and at least 1.0 pound-inches/mil in either or both of the longitudinal and transverse directions. Preferred ranges of tear propagation/mil are between 0.45 and 1.2, preferably between 0.5 and 1.2, more preferably between 0.55 and 1.2, and most preferably between 0.6 and 1.2 pound inches/mil, such as between 0.7 and 1.1, and between 0.8 and 1.0 pound-inches/mil in either or both of the longitudinal and transverse directions.

The multilayer films of the present invention can have an instrumented impact/mil value (ASTM D 3763-95a) of at least 0.5, preferably at least 0.6, more preferably at least 0.7, and most preferably at least 0.8 joules/mil, such as at least 0.9, at least 1.0, at least 1.2, and at least 1.5 joules/mil. Preferred ranges of instrumented impact/mil are between 0.5 and 2, preferably between 0.6 and 2, more preferably between 0.7 and 2, and most preferably between 0.8 and 2 joules/mil, such as between 1.0 and 1.8, between 1.1 and 1.6, and between 1.2 and 1.4 joules/mil.

The polymeric components used to fabricate multilayer films according to the present invention can also contain appropriate amounts of other additives normally included in such compositions. These include slip agents, antioxidants, fillers, dyes, pigments, radiation stabilizers, antistatic agents, elastomers, and other additives known to those of skill in the art of packaging films.

Although the primary end-use contemplated for this invention is the packaging of coins, the present films can be beneficially used to package other objects, especially metallic objects, and/or those with sharp edges or points. Examples include tools, metal fasteners such as nails, screws, nuts, washers, tacks, hard plastic components, gems, and the like.

It is to be understood that variations of the present invention can be made without departing from the scope of the invention, which is not limited to the specific embodiments and examples disclosed herein, but extends to the claims presented below.

What is claimed is:

1. A multilayer film comprising:
   a) a core layer comprising a polymer selected from the group consisting of nylon 6, nylon 66, nylon 6,66, and polyamide elastomer;
   b) first and second intermediate layers, each disposed on a respective opposite side of the core layer, comprising polymeric adhesive;
   c) a first outer layer, disposed on the first intermediate layer, comprising ethylene/alpha olefin copolymer having a density less than 0.940 grams/cubic centimeter; and
   d) a second outer layer, disposed on the second intermediate layer, comprising a heat sealable polymer selected from the group consisting of
      i) ethylene/alpha olefin copolymer having a density less than 0.921 grams/cubic centimeter,
      ii) ethylene/vinyl acetate copolymer,
      iii) ethylene/alkyl (meth)acrylate copolymer,
      iv) ethylene/(meth)acrylic acid copolymer, and
      v) ionomer;
   wherein the film has
      i) a tear propagation/mil value (ASTM D 1938) of at least 0.45 pound-inches/mil in the longitudinal direction, and at least 0.45 pound-inches/mil in the transverse direction, and
      ii) an instrumented impact /mil value (ASTM D 3763-95a) of at least 0.5 joules/mil.

2. The film of claim 1 wherein the polymer selected from the group consisting of nylon 6, nylon 66, nylon 6,66, and polyamide elastomer forms at least 15% by weight of the total film.

3. The film of claim 1 wherein the two intermediate layers each comprise a polymeric adhesive selected from the group consisting of anhydride modified ethylene/vinyl acetate copolymer, anhydride modified ethylene/alkyl (meth)acrylate copolymer, anhydride modified ethylene/(meth)acrylic acid copolymer, anhydride modified ethylene/alpha-olefin copolymer, and anhydride modified low density polyethylene.

4. The film of claim 1 wherein the first outer layer comprises ethylene/alpha olefin copolymer having a density of between 0.915 and 0.925 grams/cubic centimeter.

5. The film of claim 1 wherein the first outer layer comprises a blend of:
   a) an ethylene/alpha-olefin copolymer having a density of less than 0.940 grams per cubic centimeter, and
   b) a release agent selected from the group consisting of high density polyethylene, and an antiblocking agent.

6. The film of claim 1 wherein the film exhibits a free shrink (ASTM D 2732-83) of less than 5% in the longitudinal direction, and less than 5% in the transverse direction, at 96° C.

7. The film of claim 1 comprising a polymeric layer, disposed between the second intermediate layer and the second outer layer, comprising ethylene/alpha olefin copolymer having a density of less than 0.940 grams/cubic centimeter.

8. The film of claim 1 comprising a polymeric layer, disposed between the second intermediate layer and the second outer layer, comprising a material selected from the group consisting of:
   a) ethylene/vinyl acetate copolymer,
   b) ethylene/alkyl (meth)acrylate copolymer,
   c): ethylene/(meth)acrylic acid copolymer, and
   d) ionomer.

9. The film of claim 1 comprising a first polymeric layer, disposed between the first intermediate layer and the first outer layer, and a second polymeric layer, disposed between the second intermediate layer and the second outer layer, each of the first and second polymeric layers comprising ethylene/alpha olefin copolymer having a density of less than 0.940 grams/cubic centimeter.

10. The film of claim 1 comprising a first polymeric layer, disposed between the first intermediate layer and the first outer layer, and a second polymeric layer, disposed between the second intermediate layer and the second outer layer, each of the first and second polymeric layers comprising a material selected from the group consisting of:
   a) ethylene/vinyl acetate copolymer,
   b) ethylene/alkyl (meth)acrylate copolymer, c) ethylene/(meth)acrylic acid copolymer, and d) ionomer.

11. The film of claim 1 wherein the film has a total thickness of at least 4 mils.

12. The film of claim 1 wherein the film has a total thickness of between 4 and 20 mils.

13. A bag having a first and second panel, a bag bottom, and a bag mouth; wherein the bag comprises a multilayer film comprising
 a) a core layer comprising a polymer selected from the group consisting of nylon 6, nylon 66, nylon 6,66, and polyamide elastomer;
 b) first and second intermediate layers, each disposed on a respective opposite side of the core layer, comprising polymeric adhesive;
 c) a first outer layer, disposed on the first intermediate layer, comprising ethylene/alpha olefin copolymer having a density less than 0.940 grams/cubic centimeter; and
 d) a second outer layer, disposed on the second intermediate layer, comprising heat sealable polymer selected from the group consisting of
  i) ethylene/alpha olefin copolymer having a density less than 0.921 grams/cubic centimeter,
  ii) ethylene/vinyl acetate copolymer,
  iii) ethylene/alkyl (meth)acrylate copolymer,
  iv) ethylene/(meth)acrylic acid copolymer, and
  v) ionomer;
 wherein the film has
  i) a tear propagation /mil value (ASTM D 1938) of at least 0.45 pound-inches/mil in the longitudinal direction, and at least 0.45 pound-inches/mil in the transverse direction, and;
  ii) an instrumented impact/mil value (ASTM D 3763-95a) of at least 0.5joules/mil.

14. The bag of claim 13 wherein the polymer selected from the group consisting of nylon 6, nylon 66, nylon 6,66, and polyamide elastomer forms at least 15% by weight of the total film.

15. The bag of claim 13 wherein the two intermediate layers each comprise a polymeric adhesive selected from the group consisting of anhydride modified ethylene/vinyl acetate copolymer, anhydride modified ethylene/alkyl (meth)acrylate copolymer, anhydride modified ethylene/(meth)acrylic acid copolymer, anhydride modified ethylene/alpha-olefin copolymer, and anhydride modified low density polyethylene.

16. The bag of claim 13 wherein the first outer layer comprises ethylene/alpha olefin copolymer having a density of between 0.915 and 0.925 grams/cubic centimeter.

17. The bag of claim 13 wherein the first outer layer of the film comprises a blend of:
 a) ethylene/alpha-olefin copolymer having a density of less than 0.940 grams per cubic centimeter, and
 b) a release agent selected from the group consisting of high density polyethylene, and an antiblocking agent.

18. The bag of claim 13 wherein the bag exhibits a free shrink (ASTM D 2732-83) of less than 5% in the longitudinal direction, and less than 5% in the transverse direction, at 96° C.

19. The bag of claim 13 comprising a polymeric layer, disposed between the second intermediate layer and the second outer layer, comprising ethylene/alpha olefin copolymer having a density of less than 0.940 grams/cubic centimeter.

20. The bag of claim 13 comprising a polymeric layer, disposed between the second intermediate layer and the second outer layer, comprising a material selected from the group consisting of:
 a) ethylene/vinyl acetate copolymer,
 b) ethylene/alkyl (meth)acrylate copolymer,
 c) ethylene/(meth)acrylic acid copolymer, and
 d) ionomer.

21. The bag of claim 13 comprising a first polymeric layer, disposed between the first intermediate layer and the first outer layer, and a second polymeric layer, disposed between the second intermediate layer and the second outer layer, each of the first and second polymeric layers comprising ethylene/alpha olefin copolymer having a density of less than 0.940 grams/cubic centimeter.

22. The bag of claim 13 comprising a first polymeric layer, disposed between the first intermediate layer and the first outer layer, and a second polymeric layer, disposed between the second intermediate layer and the second outer layer, each of the first and second polymeric layers comprising a material selected from the group consisting of:
 a) ethylene/vinyl acetate copolymer,
 b) ethylene/alkyl (meth)acrylate copolymer,
 c) ethylene/(meth)acrylic acid copolymer, and
 d) ionomer.

23. An article comprising:
 a) a sealed bag having a first and second panel, a bag bottom, and a sealed bag mouth, wherein the bag comprises a multilayer film comprising
  i) a core layer comprising a polymer selected from the group consisting of nylon 6, nylon 66, nylon 6,66, and polyamide elastomer;
  ii) first and second intermediate layers, each disposed on a respective opposite side of the core layer, comprising ethylenic polymeric adhesive;
  iii) a first outer layer, disposed on the first intermediate layer, comprising ethylene/alpha olefin copolymer having a density of less than 0.940 grams/cubic centimeter; and
  iv) a second outer layer, disposed on the second intermediate layer, comprising a heat sealable polymer selected from the group consisting of
   (a) ethylene/alpha olefin copolymer having a density of less than 0.921 grams/cubic centimeter,
   (b) ethylene/vinyl acetate copolymer,
   (c) ethylene/alkyl (meth)acrylate copolymer,
   (d) ethylene/(meth)acrylic acid copolymer, and
   (e) ionomer;
  wherein the film has
   i) a tear propagation/mil value (ASTM D 1938) of at least 0.45 pound-inches/mil in the longitudinal direction, and at least 0.45 pound-inches/mil in the transverse direction, and
   ii) an instrumented impact/mil value (ASTM D 3763-95a) of at least 0.5 joules/mil; and
 b) objects inside the sealed bag.

24. The article of claim 23 wherein the objects inside the sealed bag are coins.

25. A multilayer film comprising:
 a) a core layer consisting essentially of a polymer selected from the group consisting of nylon 6, nylon 66, nylon 6,66, and polyamide elastomer;
 b) first and second intermediate layers, each disposed on a respective opposite side of the core layer, comprising polymeric adhesive;
 c) a first outer layer, disposed on the first intermediate layer, comprising ethylene/alpha olefin copolymer having a density less than 0.940 grams/cubic centimeter; and d) a second outer layer, disposed on the second intermediate layer, comprising a heat sealable polymer selected from the group consisting of
  i) ethylene/alpha olefin copolymer having a density less than 0.921 grams/cubic centimeter,
  ii) ethylene/vinyl acetate copolymer,
  iii) ethylene/alkyl (meth)acrylate copolymer,
  iv) ethylene/(meth)acrylic acid copolymer, and
  v) ionomer;

wherein the film has
  i) a tear propagation/mil value (ASTM D 1938) of at least 0.45 pound-inches/mil in the longitudinal direction, and at least 0.45 pound-inches/mil in the transverse direction, and
  ii) an instrumented impact /mil value (ASTM D 3763-95a) of at least 0.5 joules/mil.

* * * * *